(12) United States Patent
Tahara et al.

(10) Patent No.: US 11,329,323 B2
(45) Date of Patent: May 10, 2022

(54) MANUFACTURING METHOD OF SECONDARY BATTERY

(71) Applicant: Murata Manufacturing Co., Ltd., Nagaokakyo (JP)

(72) Inventors: Retsu Tahara, Nagaokakyo (JP); Toru Kawai, Nagaokakyo (JP); Masato Fujioka, Nagaokakyo (JP); Takuya Kenko, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 285 days.

(21) Appl. No.: 16/677,877

(22) Filed: Nov. 8, 2019

(65) Prior Publication Data

US 2020/0076003 A1 Mar. 5, 2020

Related U.S. Application Data

(63) Continuation of application No. PCT/JP2018/019647, filed on May 22, 2018.

(30) Foreign Application Priority Data

Jun. 1, 2017 (JP) .............................. JP2017-109461

(51) Int. Cl.
*H01M 10/0585* (2010.01)
*H01M 10/0525* (2010.01)
(Continued)

(52) U.S. Cl.
CPC ..... *H01M 10/0585* (2013.01); *H01M 4/0404* (2013.01); *H01M 4/139* (2013.01);
(Continued)

(58) Field of Classification Search
CPC ......... H01M 10/0585; H01M 10/0525; H01M 10/0472; H01M 10/049; H01M 10/0565
See application file for complete search history.

(56) References Cited

U.S. PATENT DOCUMENTS 9,548,475 B2 1/2017 Kang et al.
9,893,376 B2 2/2018 Yang et al.
(Continued)

FOREIGN PATENT DOCUMENTS

CN 102208688 A 10/2011
CN 104981935 A 10/2015
(Continued)

OTHER PUBLICATIONS

International Search Report issued in PCT/JP2018/019647, dated Jul. 17, 2018.
(Continued)

*Primary Examiner* — Matthew J Merkling
(74) *Attorney, Agent, or Firm* — ArentFox Schiff LLP (57) ABSTRACT

A manufacturing method of a secondary battery is provided to improve a manufacturing efficiency of a non-rectangular electrode. The manufacturing method is provided for a secondary battery and includes forming the non-rectangular electrode. The step of forming the electrode includes, prior to forming an electrode precursor by applying an electrode material layer raw material to a metal sheet material that becomes a current collector, controlling a wettability of a local portion of a surface of the metal sheet material to the electrode material layer raw material and forming a wettability control region in the local portion. The local portion becomes a cutaway region of the non-rectangular electrode.

18 Claims, 8 Drawing Sheets

(51) Int. Cl.
*H01M 4/70* (2006.01)
*H01M 4/04* (2006.01)
*H01M 4/139* (2010.01)
*H01M 10/04* (2006.01)
*H01M 10/0565* (2010.01)

(52) U.S. Cl.
CPC ......... *H01M 4/70* (2013.01); *H01M 10/0525* (2013.01); *H01M 10/049* (2013.01); *H01M 10/0472* (2013.01); *H01M 10/0565* (2013.01)

(56) References Cited

U.S. PATENT DOCUMENTS

| | | | |
|---|---|---|---|
| 9,905,891 | B2 | 2/2018 | Ryu et al. |
| 2011/0236755 | A1* | 9/2011 | Ogino .................. H01M 4/0404 429/218.1 |
| 2014/0099558 | A1* | 4/2014 | Itakura .............. H01M 10/0585 429/336 |
| 2015/0037664 | A1 | 2/2015 | Kang et al. |
| 2015/0372338 | A1* | 12/2015 | Tsuchiya ........... H01M 10/0587 429/94 |
| 2015/0372353 | A1 | 12/2015 | Ryu et al. |
| 2016/0020035 | A1* | 1/2016 | Inoue .................. H01M 10/052 429/219 |
| 2016/0049687 | A1 | 2/2016 | Yang et al. |

FOREIGN PATENT DOCUMENTS

| | | |
|---|---|---|
| JP | 2001023619 A | 1/2001 |
| JP | 2004303589 A | 10/2004 |
| JP | 2008270004 A | 11/2008 |
| JP | 2011041892 A | 3/2011 |
| JP | 2014150023 A | 8/2014 |
| JP | 2015112520 A | 6/2015 |
| JP | 2015518256 A | 6/2015 |
| JP | 2015536036 A | 12/2015 |
| JP | 2016506606 A | 3/2016 |
| JP | 2017066527 A | 4/2017 |

OTHER PUBLICATIONS

Written Opinion of the International Searching Authority issued in PCT/JP2018/019647, dated Jul. 17, 2018.
Chinese Office Action issued for Chinese Patent Application No. 201880035107.6, date of issuance of Chinese Office Action dated Jan. 28, 2022.

* cited by examiner

MANUFACTURING METHOD OF SECONDARY BATTERY

CROSS REFERENCE TO RELATED APPLICATIONS

The present application is a continuation of PCT/JP2018/019647 filed May 22, 2018, which claims priority to Japanese Patent Application No. 2017-109461, filed Jun. 1, 2017, the entire contents of each of which are incorporated herein by reference.

TECHNICAL FIELD

The present invention relates to a manufacturing method of a secondary battery.

BACKGROUND

A secondary battery that can be repeatedly charged and discharged has been used for various applications conventionally. For example, such secondary batteries can be used as a power source of an electronic device, such as a smartphone and a notebook computer.

In general, a secondary battery is composed of at least a positive electrode, a negative electrode, and a separator therebetween. The positive electrode includes a positive electrode material layer and a positive electrode current collector, and the negative electrode includes a negative electrode material layer and a negative electrode current collector.

The positive electrode and the negative electrode, that is, the electrodes which are components of the secondary battery, can be obtained mainly through the following steps. Specifically, an electrode material layer raw material is applied, using a die head, to a metal sheet material that becomes a current collector to form an electrode precursor, and then the electrode precursor is cut to obtain plural electrodes.

In addition, as an application method of the electrode material layer raw material, the continuous application method and the intermittent application method are mentioned from a viewpoint of a manufacturing efficiency of an electrode. The former continuous application method is a method of continuously applying the electrode material layer raw material on a moving metal sheet material using a die head (see Patent Document 1; identified below). On the other hand, the latter intermittent application method is a method of intermittently applying the electrode material layer raw material on a moving metal sheet material using a die head (see Patent Document 2; identified below).

Patent Document 1: Japanese Patent Application Laid-Open No. 2011-41892 A.
Patent Document 2: Japanese Patent Application Laid-Open No. 2015-112520 A.

SUMMARY OF THE INVENTION

Figure 8:
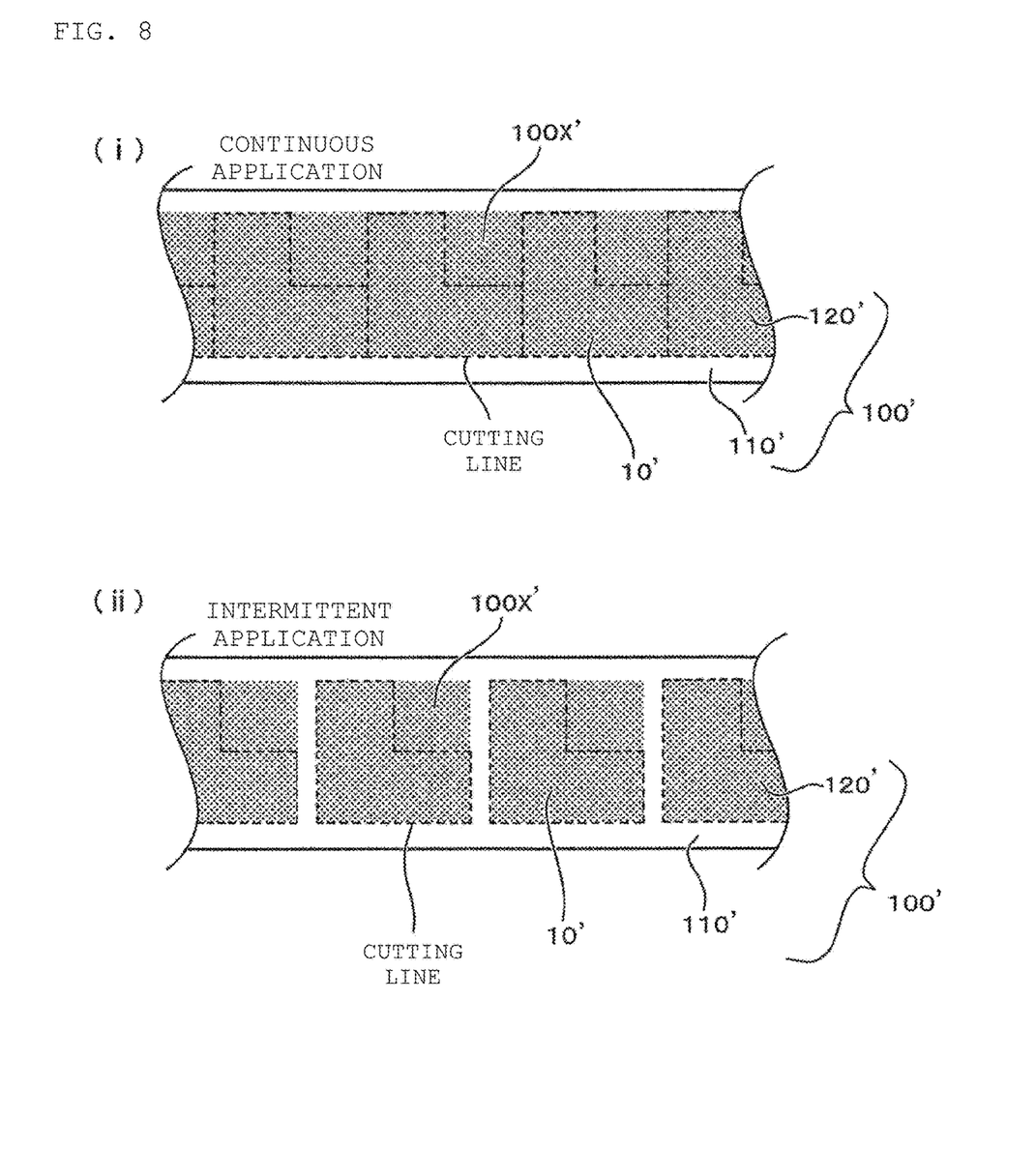
FIG. 8 is a schematic view showing a technical problem found by inventors of the present application.

Here, the inventors have found that following problems may occur when the electrode precursor, obtained by applying the electrode material layer raw material to the metal sheet material to be the current collector, is cut to obtain an electrode, for example, as shown in FIG. 8.

Specifically, an electrode material layer raw material 120' is applied to a metal sheet material 110' to form an electrode precursor 100', and then the electrode precursor 100' is cut to form plural non-rectangular electrodes 10'. In this case, an amount of a redundant portion 100X' of the electrode precursor 100' after cutting can become relatively large as compared to a case of forming plural rectangular electrodes. Because the redundant portion 100' of the electrode precursor 100' may be discarded without being reused at present, if the amount of the redundant portion 100X' is relatively large, an amount of waste may become relatively large. An increase in the amount of waste of the redundant portion 100' of the electrode precursor 100' may lead to a decrease in the production efficiency of the non-rectangular electrode 10'. As a result, the manufacturing efficiency of the secondary battery including the non-rectangular electrode 10' may be reduced as a whole.

Accordingly, the exemplary embodiments of the present invention have been made in view of such circumstances. That is, a main object of the present invention is to provide a manufacturing method a secondary battery that improves the manufacturing efficiency of a non-rectangular electrode.

In order to achieve the above object, one exemplary embodiment of the present invention is a manufacturing method of a secondary battery that includes forming a non-rectangular electrode. Specifically, the method includes, prior to forming an electrode precursor by applying an electrode material layer raw material on a metal sheet material that becomes a current collector, controlling wettability of a local portion on a surface of the metal sheet material to the electrode material layer raw material and forming a wettability control region at the local portion. The local portion is a portion that becomes a cutaway region of the non-rectangular electrode.

According to an exemplary embodiment of the present invention, the manufacturing efficiency of the non-rectangular electrode can be improved.

BRIEF DESCRIPTION OF DRAWINGS

FIGS. 2A(a) to 2A(e) are schematic views of a manufacturing flow of a secondary battery according to another exemplary embodiment.

FIGS. 2B(a) to 2B(e) are schematic views of a manufacturing flow of the secondary battery according to the other exemplary embodiment.

DETAILED DESCRIPTION

Before describing a manufacturing method of a secondary battery according to one exemplary embodiment of the present invention, a basic configuration of the secondary battery is described. For purposes of this disclosure, the term "secondary battery" generally refers to a battery that can be repeatedly charged and discharged. It is noted, however, that the secondary battery is not excessively limited by the name, and may include, for example, a "power storage device" and the like. Moreover, the term "plan view" as used herein refers to a state of viewing an object from an upper side or lower side along a thickness direction based on a laminating direction of electrode materials forming the secondary battery. Further, a term "cross-sectional view" as used herein refers to a state of viewing from a direction substantially perpendicular to the thickness direction based on the laminating direction of the electrode materials forming the secondary battery. Terms "vertical direction" and "horizontal direction" used directly or indirectly herein correspond to a vertical direction and a horizontal direction in the figure, respectively. Moreover, it is noted that unless otherwise stated, the same reference signs or symbols indicate the same components or parts or the same content. In a preferred mode, a vertically downward direction (i.e., a direction in which the gravity acts) corresponds to a "downward direction", and an opposite direction thereto corresponds to an "upward direction".

[Basic Configuration of Secondary Battery]

The exemplary embodiment of the present invention provides a secondary battery. As noted above, the term "secondary battery" as used herein refers to a battery that can be repeatedly charged and discharged. According to an exemplary aspect, the secondary battery has a structure in which an electrode assembly and an electrolyte are housed and sealed inside an exterior body. Moreover, the electrode assembly may have a planar laminated structure in which plural electrode constituent layers including a positive electrode, a negative electrode, and a separator are laminated. Also, the exterior body can take a form of a conductive hard case or a flexible case (such as a pouch). In a case of the form of the exterior body being a flexible case (such as a pouch), each of the plural positive electrodes is connected to a positive electrode external terminal while interposing a positive electrode current collector lead therebetween. The positive electrode external terminal is fixed to the exterior body by a seal portion, and the seal portion prevents the electrolyte from leaking. Similarly, each of the plural negative electrodes is connected to a negative electrode external terminal while interposing a negative electrode current collector lead therebetween. The negative electrode external terminal is fixed to the exterior body by the seal portion, and the seal portion prevents the electrolyte from leaking. It is noted that the configuration is not limited to the above, and the positive electrode current collector lead connected to each of the plural positive electrodes may include a function of the positive electrode external terminal, and further, the negative electrode current collector lead connected to each of the plural negative electrodes may include a function of the negative electrode external terminal. In a case of the form of the exterior body being a conductive hard case, each of the plural positive electrodes is connected to the positive electrode external terminal while interposing the positive electrode current collector lead therebetween. The positive electrode external terminal is fixed to the exterior body by a seal portion, and the seal portion prevents the electrolyte from leaking.

Figure 7:
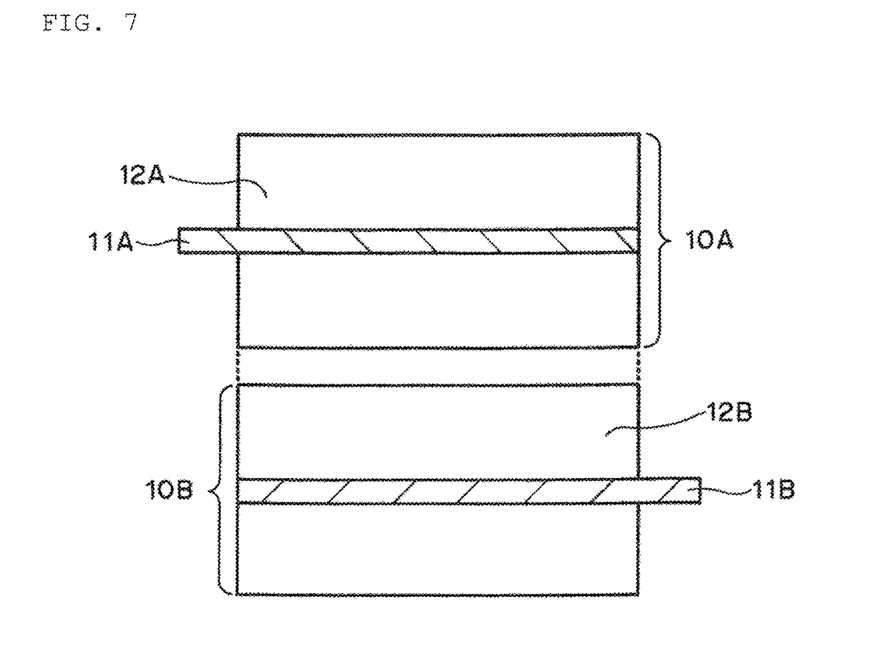
FIG. 7 is a cross-sectional view schematically showing a basic configuration of an electrode constituent layer.

According to an exemplary aspect, the positive electrode 10A includes at least a positive electrode current collector 11A and a positive electrode material layer 12A (see FIG. 7), and the positive electrode material layer 12A is provided on at least one surface of the positive electrode current collector 11A. A positive electrode-side extended tab is positioned at a portion where the positive electrode material layer 12A is not provided among the positive electrode current collector 11A, that is, an end part of the positive electrode current collector 11A. The positive electrode material layer 12A contains a positive electrode active material as an electrode active material. Similarly, the negative electrode 10B includes at least a negative electrode current collector 11B and a negative electrode material layer 12B (see FIG. 7), and the negative electrode material layer 12B is provided on at least one surface of the negative electrode current collector 11B. A negative electrode-side extended tab is positioned at a portion where the negative electrode material layer 12B is not provided among the negative electrode current collector 11B, that is, an end part of the negative electrode current collector 11B. The negative electrode material layer 12B contains a negative electrode active material as an electrode active material.

The positive electrode active material contained in the positive electrode material layer 12A and the negative electrode active material contained in the negative electrode material layer 12B are substances directly involved in transfer of electrons in the secondary battery, and are main substances of positive and negative electrodes responsible for charge and discharge, that is, a battery reaction. More specifically, ions are provided to the electrolyte by the positive electrode active material contained in the positive electrode material layer 12A and the negative electrode active material contained in the negative electrode material layer 12B, and the ions move and transfer electrons between the positive electrode 10A and the negative electrode 10B to perform charging and discharging. The positive electrode material layer 12A and the negative electrode material layer 12B are preferably layers that can store and release lithium ions, for example. In other words, a secondary battery is preferable in which lithium ions move between the positive electrode 10A and the negative electrode 10B through the electrolyte to perform charging and discharging of the battery. In a case of lithium ions being involved in charging and discharging, the secondary battery corresponds to a so-called "lithium ion battery".

It is preferable that where the positive electrode active material of the positive electrode material layer 12A is made of, for example, a granular material, a binder is included in the positive electrode material layer 12A, for providing more sufficient contact between grains and retaining a shape. Furthermore, a conductive auxiliary agent may be contained in the positive electrode material layer 12A in order to facilitate the transfer of electrons promoting cell reactions. Similarly, it is preferable that where the negative electrode active material of the negative electrode material layer 12B is made of, for example, a granular material, a binder is included for providing more sufficient contact between grains and retaining a shape. Further, a conductive auxiliary agent may be contained in the negative electrode material layer 12B in order to facilitate the transfer of electrons promoting cell reactions. Thus, the positive electrode material layer 12A and the negative electrode material layer 12B can also be referred to as a "positive electrode mixture layer" and a "negative electrode mixture layer", respectively, from the form of containing plural components.

The positive electrode active material is preferably a material that contributes to storing and releasing of lithium ions. In this respect, the positive electrode active material is preferably, for example, a lithium-containing composite oxide. More specifically, the positive electrode active material is preferably a lithium transition metal composite oxide containing lithium and at least one transition metal selected from the group consisting of cobalt, nickel, manganese and iron. That is, in the positive electrode material layer 12A of the secondary battery, the above lithium transition metal composite oxide is preferably contained as the positive electrode active material. For example, the positive electrode active material may be lithium cobaltate, lithium nickelate, lithium manganate, lithium iron phosphate, or some of the above transition metals replaced with another metal. The above positive electrode active material may be contained as a single species but may be contained in combination of two or more species. In a more preferable mode, the positive electrode active material contained in the positive electrode material layer 12A is lithium cobaltate.

The binder that may be contained in the positive electrode material layer 12A is not particularly limited, but can include at least one species selected from the group consisting of polyvinylidene fluoride, vinylidene fluoride-hexafluoropropylene copolymer, vinylidene fluoride-tetrafluorothyrene copolymer, polytetrafluorothylene, and the like. The conductive auxiliary agent that may be contained in the positive electrode material layer 12A is not particularly limited, but can include at least one species selected from thermal black, furnace black, channel black, carbon black such as ketjen black and acetylene black, graphite, carbon fiber such as carbon nanotube and vapor growth carbon fiber, metal powder such as copper, nickel, aluminum and silver, and polyphenylene derivatives. For example, the binder of the positive electrode material layer 12A may be polyvinylidene fluoride. Although merely illustrative, the conductive auxiliary agent of the positive electrode material layer 12A is carbon black. Furthermore, in a preferred aspect, the binder and the conductive auxiliary agent of the positive electrode material layer 12A may be a combination of polyvinylidene fluoride and carbon black.

The negative electrode active material is preferably a material that contributes to storing and releasing of lithium ions. In this respect, the negative electrode active material is preferably, for example, various carbon materials, oxides, lithium alloys, or the like.

As the various carbon materials of the negative electrode active material, graphite (natural graphite, artificial graphite), soft carbon, hard carbon, diamond-like carbon and the like can be mentioned. In particular, graphite is preferable in that it has high electron conductivity and excellent adhesion to the negative electrode current collector 11B. As the oxide of the negative electrode active material, at least one species selected from the group consisting of silicon oxide, tin oxide, indium oxide, zinc oxide, lithium oxide and the like can be mentioned. The lithium alloy of the negative electrode active material may be any metal that can be alloyed with lithium, and for example, it may be a binary, ternary or higher alloy of lithium and metal such as Al, Si, Pb, Sn, In, Bi, Ag, Ba, Ca, Hg, Pd, Pt, Te, Zn, and La. The above oxide is preferably amorphous as its structural form. This is because deterioration due to nonuniformity such as grain boundaries or defects is less likely to occur. Although merely illustrative, the negative electrode active material of the negative electrode material layer 12B may be artificial graphite.

The binder that may be contained in the negative electrode material layer 12B is not particularly limited, but can include at least one species selected from the group consisting of styrene butadiene rubber, polyacrylic acid, polyvinylidene fluoride, polyimide resin and polyamideimide resin. For example, the binder contained in the negative electrode material layer 12B may be styrene butadiene rubber. The conductive auxiliary agent that may be contained in the negative electrode material layer 12B is not particularly limited, but can include at least one species selected from thermal black, furnace black, channel black, carbon black such as ketjen black and acetylene black, graphite, carbon fiber such as carbon nanotube and vapor growth carbon fiber, metal powder such as copper, nickel, aluminum and silver, and polyphenylene derivatives. In addition, a component resulting from a thickener component (for example, carboxymethylcellulose) used at the time of manufacturing the battery may be contained in the negative electrode material layer 12B.

In an exemplary aspect, the negative electrode active material and the binder in the negative electrode material layer 12B may be a combination of artificial graphite and styrene butadiene rubber.

The positive electrode current collector 11A and the negative electrode current collector 11B used in the positive electrode 10A and the negative electrode 10B are members that contribute to collecting or supplying electrons generated in the active material by the battery reaction. The above current collector may be a sheet-like metal member, and may have a porous or perforated form. For example, the current collector may be metal foil, punching metal, netting, expanded metal or the like. The positive electrode current collector 11A used in the positive electrode 10A is preferably made of a metal foil containing at least one selected from the group consisting of aluminum, stainless steel, nickel and the like, and may be, for example, an aluminum foil. On the other hand, the negative electrode current collector 11B used in the negative electrode 10B is preferably made of a metal foil containing at least one selected from the group consisting of copper, stainless steel, nickel and the like, and may be, for example, a copper foil.

Moreover, a separator 50 is a member provided from the viewpoint of preventing short circuit due to contact of positive and negative electrodes and retaining electrolyte. In other words, the separator 50 is said to be a member that allows ions to pass while preventing electronic contact between the positive electrode 10A and the negative electrode 10B. Preferably, the separator 50 is a porous or microporous insulating member and has a membrane form due to its small thickness. In an exemplary aspect, a microporous polyolefin membrane may be used as a separator. In this regard, the microporous film used as the separator 50 may be the one that includes, for example, only polyethylene (PE) or only polypropylene (PP) as the polyolefin. Furthermore, the separator 50 may be a laminate formed of a "microporous membrane made of PE" and a "microporous membrane made of PP". A surface of the separator 50 may be covered with an inorganic grain coat layer and/or an adhesive layer, or the like. The surface of the separator may have adhesion.

It should be appreciated that the separator 50 is not particularly limited by the name, and may be a solid electrolyte, a gel electrolyte, insulating inorganic grains, or the like having a similar function. From the viewpoint of further improving handling of the electrodes, it is preferable that the separator 50 and the electrodes (i.e., the positive electrode 10A/negative electrode 10B) be adhered. The adhesion between the separator 50 and the electrodes can be achieved by using an adhesive separator as the separator 50, applying and/or heat pressure bonding an adhesive binder on the electrode material layers (i.e., the positive electrode material layer 12A/negative electrode material layer 12B), and the like. As the material of the adhesive binder that provides adhesion to the separator 50 or electrode material layer, polyvinylidene fluoride, vinylidene fluoride-hexafluoropropylene polymer, acrylic resin, and the like can be mentioned.

A thickness of the adhesive layer formed by applying the adhesive binder or the like may be 0.5 µm or more and 5 µm or less.

When the positive electrode 10A and the negative electrode 10B have a layer capable of storing and releasing lithium ions, the electrolyte is preferably a non-aqueous electrolyte, such as an organic electrolyte and/or an organic solvent (that is, the electrolyte is preferably a non-aqueous electrolyte). In the electrolyte, metal ions released from the electrodes (positive electrode 10A and negative electrode 10B) are present, and therefore, the electrolyte assists the movement of the metal ions in the battery reaction.

The non-aqueous electrolyte is an electrolyte containing a solvent and a solute. As a specific non-aqueous electrolyte solvent, one containing at least a carbonate is preferable. The above carbonate may be cyclic carbonates and/or linear carbonates. Although not particularly limited, as cyclic carbonates, at least one species selected from the group consisting of propylene carbonate (PC), ethylene carbonate (EC), butylene carbonate (BC), and vinylene carbonate (VC) can be mentioned. As linear carbonates, at least one species selected from the group consisting of dimethyl carbonate (DMC), diethyl carbonate (DEC), ethyl methyl carbonate (EMC) and dipropyl carbonate (DPC) can be mentioned. In an exemplary aspect, combinations of cyclic carbonates and linear carbonates may be used as the non-aqueous electrolyte, and for example, a mixture of ethylene carbonate and diethyl carbonate may be used. Further, as a specific non-aqueous electrolyte solute, preferably, for example, lithium salt such as $LiPF_6$, $LiBF_4$ is used. Further, as a specific non-aqueous electrolyte solute, preferably, for example, lithium salt such as such as $LiPF_6$ and/or $LiBF_4$ is used.

As the positive electrode current collector lead and the negative electrode current collector lead, any current collector lead used in the field of secondary battery can be used. The above current collector lead may be made of a material that allows electrons to move, and for example, is composed of a conductive material such as aluminum, nickel, iron, copper, stainless steel or the like. The positive electrode current collector lead is preferably made of aluminum, and the negative electrode current collector lead is preferably made of nickel. A form of the positive electrode current collector lead and the negative electrode current collector lead is not particularly limited, and may be, for example, in a shape of a wire or plate.

As the external terminal, any external terminal used in the field of secondary battery can be used. The above external terminal may be made of a material that allows electrons to move, and is usually made of a conductive material such as aluminum, nickel, iron, copper, stainless steel or the like. The external terminals 5 may be electrically and directly connected to a substrate, or may be electrically and indirectly connected to the substrate through other devices. In addition, it is not limited to the above, and the positive electrode current collector lead connected to each of the plural positive electrodes may be provided with a function of the positive electrode external terminal, and the negative electrode current collector lead connected to each of the plural negative electrodes may be provided with a function of the negative electrode external terminal.

The exterior body may have the form of the conductive hard case or flexible case (such as a pouch) as described above.

The conductive hard case is composed of a main body part and a lid part. The main body part is composed of a bottom part forming a bottom surface of the exterior body and a side part. The main body part and the lid part are sealed after housing the electrode assembly, the electrolyte, the current collector lead and the external terminal. A sealing method is not particularly limited, and for example, a laser irradiation method is mentioned. As a material that forms a main body part and a lid part, any material that can form a hard case type exterior body in the field of secondary battery can be used. The above material may be any material that allows electrons to move, and for example, a conductive material such as aluminum, nickel, iron, copper, stainless steel or the like is mentioned. Dimensions of the main body part and the lid part are mainly determined in accordance with a dimension of the electrode assembly, and for example, it is preferable to have dimensions around those that prevent electrode assembly from moving in the exterior body when the electrode assembly is accommodated in the exterior body. By preventing the electrode assembly from moving, the electrode assembly is prevented from being broken, and safety of the secondary battery improves.

The flexible case is composed of a soft sheet. The soft sheet only needs to have a softness around that allows the seal portion to be bent, and preferably, is a plastic sheet. The plastic sheet is a sheet having a property in which deformation by an external force is maintained after the external force is applied thereto and removed therefrom, and for example, a so-called laminate film can be used. The flexible pouch made of a laminate film can be produced by, for example, laminating two sheets of laminate films and heat-sealing peripheral parts of the laminate films. As the laminate film, a film obtained by laminating a metal foil and a polymer film is generally used, and specifically, one having a three-layer structure composed of an outer layer polymer film/metal foil/inner layer polymer film is exemplified. The outer layer polymer film is intended to prevent damage to the metal foil caused by permeation and contact of moisture and the like, and polymers such as polyamide and polyester can be suitably used. The metal foil is intended to prevent permeation of moisture and gas, and a foil of copper, aluminum, stainless steel, or the like can be suitably used. The inner layer polymer film is intended to protect the metal foil from the electrolyte contained inside and also to melt and seal the laminate film at the time of heat sealing, and polyolefin or acid-modified polyolefin can be suitably used.

[Manufacturing Method of Secondary Battery]

In view of the basic configuration of the secondary battery as described above, a manufacturing method of the secondary battery according to one exemplary embodiment is described below.

Specifically, the exemplary manufacturing method improves the production efficiency of non-rectangular electrodes.

Figure 6:
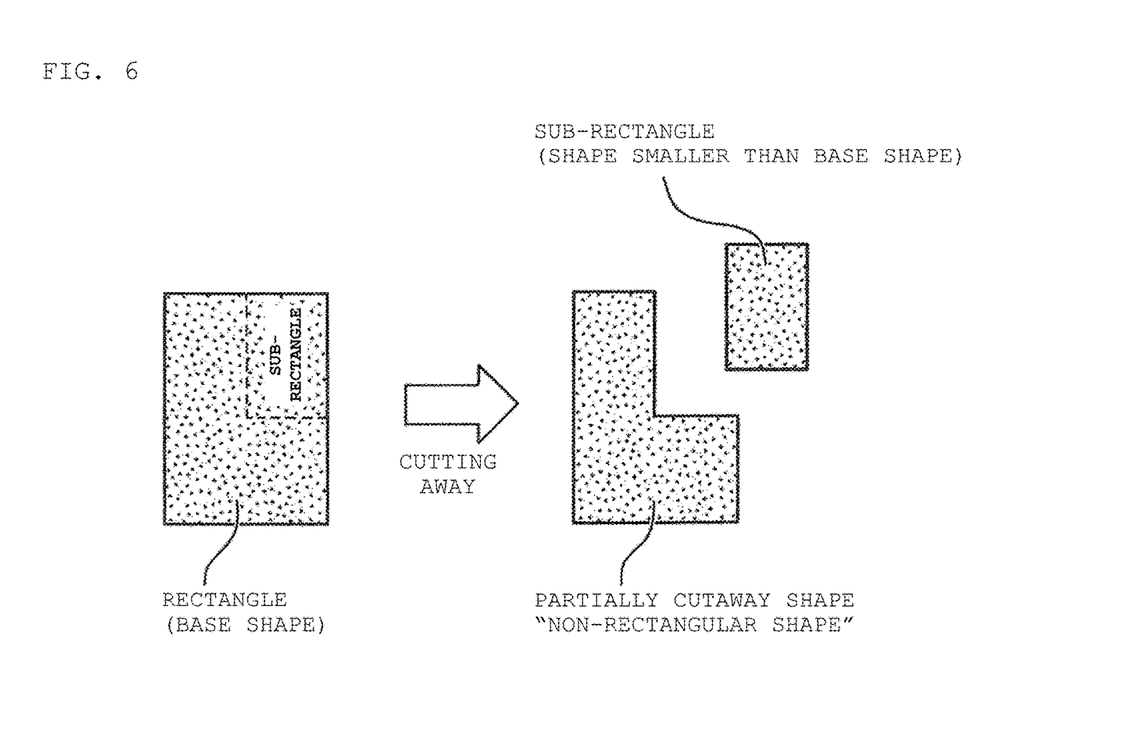
FIG. 6 is a schematic view for explaining a definition of a non-rectangular shape.

First, for purposes of the disclosure, definition of terms used in the present description are provided as follows. The term "non-rectangular electrode" as used herein refers broadly to an electrode having a shape that is not square or rectangular in a plan view, and in a narrow sense, refers to an electrode having a shape partially cut away from a square or rectangle in a plan view. An example of the "non-rectangular electrode" as used herein includes an electrode having a shape in which a corner portion of the square or rectangle is cut away. Without limitation thereto, an example of the "non-rectangular electrode" as referred to herein includes an electrode having a shape in which a non-corner portion (for example, central portions) of a square and a rectangle are cut away. Although merely illustrative, the term "non-rectangular" as used herein may be a shape obtained by, based on a base shape of the electrode that is a square or rectangle in a plan view, cutting away a part of a square, rectangular, semi-circular, semi-elliptical, or circular/elliptical shape in a plan view smaller than the base shape, or a combination of the above shapes from the base shape (in particular, a shape obtained by cutting away from a corner part or non-corner part of the base shape, see FIG. 6).

Moreover, the term "metal sheet material" as referred to herein is a sheet-like member made of metal such as copper and extending in a predetermined direction, and becomes a current collector (electrode component) after an electrode precursor is cut. The term "electrode material layer raw material" as used herein refers in a broad sense to a material to become an electrode material layer (electrode component), and in a narrow sense to one containing an active material and a binder. The term "electrode precursor" as used herein refers in a broad sense to a precursor of the electrode finally obtained, and in a narrow sense to the metal sheet material and the electrode material layer raw material provided planarly on the metal sheet material. The term "wettability" as used herein refers in a broad sense to a degree of wetting of a solid surface with respect to liquid, and in a narrow sense to the degree of wetting of a surface of the metal sheet material with respect to the electrode material layer raw material, and in a narrower sense to the degree of wetting of a local portion of the surface of a modified metal sheet material with respect to the electrode material layer raw material. The term "wettability control region" as used herein refers to a region in which wettability of the local portion of the metal sheet material surface is controlled. The term "low wettability region" as used herein refers in a broad sense to a region in which the degree of wetting of the solid surface with respect to liquid is relatively low, and in a narrow sense to a region in which a degree of wetting of the local portion of the metal sheet material surface with respect to the electrode material layer raw material is relatively lower than the other portion of the surface.

In addition, the term "low wettability region group" as used herein refers to a collection of plural low wettability regions mutually separated along an extending direction of the metal sheet material in a plan view. The term "inclined part of low wettability region" as used herein refers to a portion that is inclined among the low wettability region. The term "roughening" as used herein refers to a process that forms a surface roughness of the surface of the metal sheet material to an arithmetic average roughness Rz of 1.0 μm or more and 10.0 μm or less. Note that Rz as used herein representing the surface roughness refers to the roughness Rz specified in JIS B0601. That is, Rz in the exemplary embodiment of the present invention is obtained by extracting only a reference length in a direction of an average line from a roughness curve, and measuring, in a direction of longitudinal magnification from the average line of the extracted portion, an average value of absolute values of elevations (Yp) from the highest peak to the fifth peak and an average value of absolute values of elevations (Yv) from the lowest valley to the fifth valley, calculating a sum of the two average values, and representing the obtained value in micrometers (μm) (see JIS B0601:1994).

According to an exemplary aspect and in order to improve the manufacturing efficiency of a non-rectangular electrode 10, and more specifically, in order to reduce an amount of redundant portion generated in the electrode precursor, the inventors have determined that surface characteristics of a metal sheet material 110 is controlled, and specifically, the wettability of the local portion of the surface of the metal sheet material (corresponding to a portion that becomes a cutaway region of the non-rectangular electrode) is controlled. That is, the exemplary aspects as described herein are directed to controlling the wettability of a portion of the surface of the metal sheet material that becomes the cutaway region of the non-rectangular electrode, and forming the wettability controlled region in the portion. In other words, the exemplary aspects are not particularly directed to the controlling of the wettability in the other portion except for the portion on the surface of the metal sheet material that becomes the cutaway region of the non-rectangular electrode, and treating the other portion as wettability non-controlled region.

Thus, according to an exemplary aspect, the wettability of the local portion of the surface of the metal sheet material (i.e., corresponding to the portion that becomes the cutaway region of the non-rectangular electrode) is intentionally controlled. Therefore, as compared to the other portion of the surface of the metal sheet material whose wettability is not intentionally controlled, the degree of wettability of the portion that becomes the cutaway region of the non-rectangular electrode can be made different from the degree of wettability of the other portion. Therefore, in a state in which the wettability control region is formed in the portion that becomes the cutaway region of the non-rectangular electrode on the surface of the metal sheet material, when the electrode material layer raw material is applied so as to cover the substantially entire (main surface of) metal sheet material to form the electrode precursor, because the wettability of the portion is controlled, behavior of the electrode material layer raw material that may be positioned in the portion can be controlled. In particular, when control is performed such that the electrode material layer raw material that may be positioned in the portion to be cutaway region of the non-rectangular electrode on the surface of the metal sheet material can be moved from the portion to the outer region, it is possible to suppress the electrode material layer raw material from remaining in the portion when the electrode precursor is formed.

When the electrode precursor is cut to form plural non-rectangular electrodes (more specifically, when cutting the portion that becomes the cutaway region of the non-rectangular electrode in the electrode precursor) while suppressing the electrode material layer raw material from remaining, a member to be cut may be a metal sheet material mainly located in the portion. As a result, in the portion that becomes the cutaway region of the non-rectangular electrode, the member to be cut can mainly be the metal sheet material. Accordingly, the redundant portion (i.e., waste portion) can also mainly be the metal sheet material. In other words, a ratio in which the electrode material layer raw material is contained in the redundant portion (i.e., wasted portion) can be relatively reduced as compared to the prior art. By reducing a ratio of the electrode material layer raw material contained, the amount of redundant portion (i.e., waste portion) can be reduced as a whole as compared to the prior art. As a result, the manufacturing efficiency of the non-rectangular electrode can be improved by reducing the amount of the redundant portion (i.e., waste portion).

A step of forming the non-rectangular electrode according to an exemplary aspect is specifically described with reference to FIGS. 1(a) to 1(e).

Figure 1A:
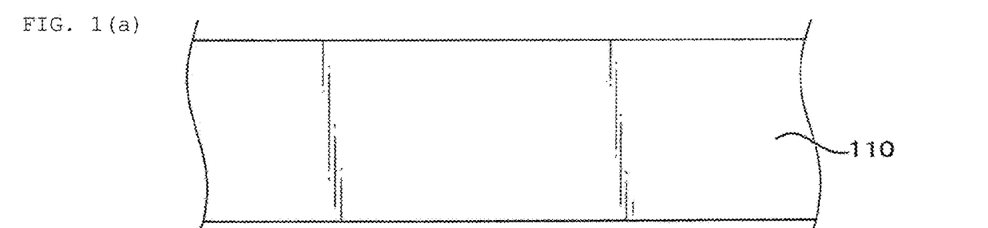
FIGS. 1(a) to 1(e) are schematic views of a manufacturing flow of a secondary battery according to one exemplary embodiment.

Preparation of Metal Sheet Material (FIG. 1(a))

First, the metal sheet material 110 is prepared.

Figure 1B:
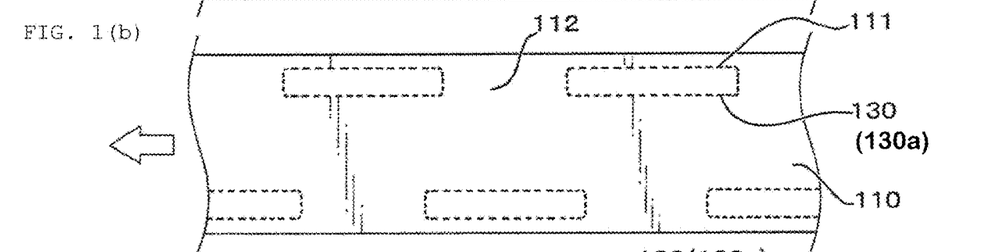

Formation of Wettability Control Region (FIG. 1(b))

Next, a wettability control region 130 is formed in a local portion of a surface (main surface) of the metal sheet material 110. The local portion of the surface (main surface)

of the metal sheet material 110 as mentioned herein corresponds to a portion that becomes the cutaway region of the non-rectangular electrode as described above. Therefore, the wettability control region 130 should be formed in the local portion of the surface (main surface) of the metal sheet material 110 after a formation location of the cutaway region of the non-rectangular electrode finally obtained is determined in advance.

By forming the wettability control region 130, the wettability of a portion 111 that becomes the cutaway region of the non-rectangular electrode on the surface of the metal sheet material 110 can be intentionally controlled. Therefore, as compared to another portion 112 of the surface of the metal sheet material 110 whose wettability is not intentionally controlled, it becomes possible to control a degree of wettability of the portion 111 that becomes the cutaway region of the non-rectangular electrode to be different from a degree of wettability of the other portion 112. Although not particularly limited, a thickness of the wettability control region 130 is 0.1 to 10 µm, preferably 0.5 to 5 µm, and for example, may be 2.5 µm, in consideration of operability of an electrode material layer raw material 120 to be applied later.

Figure 1C:
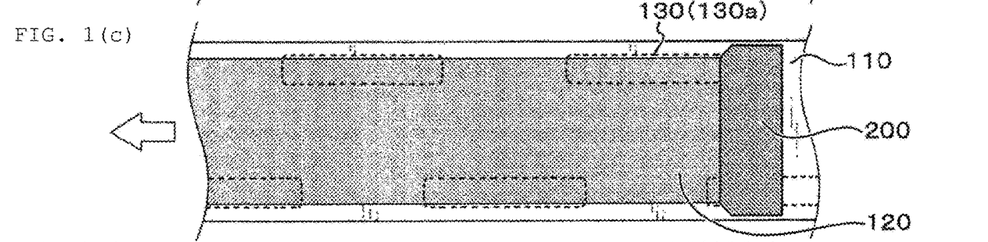

Application of Electrode Material Layer Raw Material (FIG. 1(c))

Next, while rotating the metal sheet material 110, the electrode material layer raw material 120 is applied to the surface (main surface) of the metal sheet material 110 using a die head 200. Specifically, the electrode material layer raw material 120 is applied such that the electrode material layer raw material 120 covers the wettability control region 130 formed in the portion 111 that becomes the cutaway region of the non-rectangular electrode. Although not particularly limited, a viscosity of the electrode material layer raw material 120 is 0.1 to 10 Pa·s, preferably 0.5 to 5 Pa·s, and for example, may be 2.5 Pa·s, in consideration of ease of movement of the electrode material layer raw material 120 later.

Figure 1D:
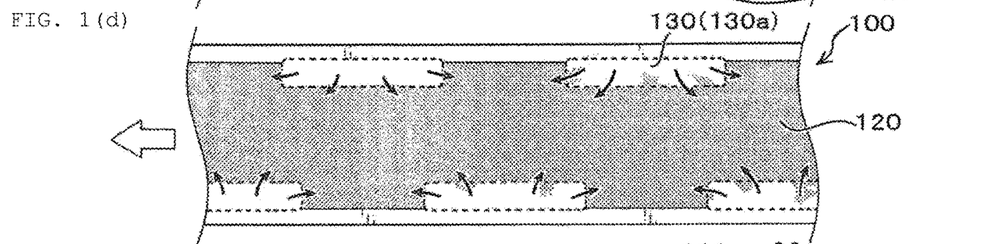

Local Movement of Electrode Material Layer Raw Material (FIG. 1(d))

With the control of the wettability of the wettability control region 130 formed in the portion 111 that becomes the cutaway region of the non-rectangular electrode when the electrode material layer raw material 120 is applied, it becomes possible to control the behavior of the electrode material layer raw material 120 that may be positioned in the portion. In particular, when control is made to move the electrode material layer raw material 120 that may be positioned in the portion 111 that becomes the cutaway region of the non-rectangular electrode from the portion 111, that is, from the wettability control region 130 to the outer region, it is possible to suppress the electrode material layer raw material 120 from remaining in the portion 111 when an electrode precursor 100 is formed. That is, it is possible to obtain the electrode precursor 100 in which the electrode material layer raw material 120 is suppressed from remaining in the portion 111 that becomes the cutaway region of the non-rectangular electrode, that is, in the wettability control region 130.

Pressing of Electrode Precursor

Although not shown in the figure, after the electrode precursor 100 is formed, the electrode precursor 100 is pressed so as to sandwich both main surfaces of the electrode precursor 100 to obtain a desired density.

Figure 1E:
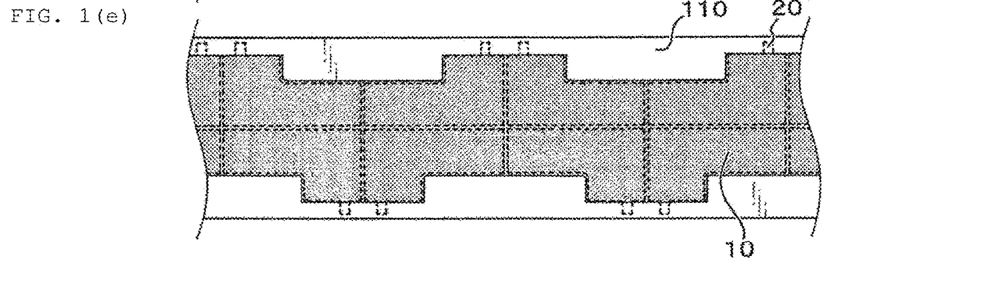

Cutting of Electrode Precursor (FIG. 1(e))

Next, the electrode precursor 100 is cut. Specifically, at least the portion 111 of the electrode precursor 100 that becomes the cutaway region of the non-rectangular electrode 10 and a portion that becomes a tab 20 are cut so that plural non-rectangular electrodes 10 each having the cutaway region and the tab 20 are formed.

Formation of Non-Rectangular Electrode

As described above, according to the exemplary embodiment, the plural desired non-rectangular electrodes 10 (with tabs 20) can be obtained.

When the electrode precursor 100 is cut, it is preferable to cut the electrode precursor 100 so that the plural non-rectangular electrodes 10 to be formed are arranged in line symmetry or point symmetry with each other. This considers a viewpoint of preferably avoiding problems such as local exfoliation of the electrode material layer raw material 120, difficulty in formation of the tab 20, and so on due to distribution of cutting load at the time of cutting the electrode precursor 100.

From the above, according to the exemplary embodiment of the present invention, the electrode material layer raw material 120 is suppressed from remaining in the portion 111 that becomes the cutaway region of the non-rectangular electrode, which is in the wettability control region 130, in the step shown in FIG. 1(d). Therefore, when the electrode precursor 100 is cut to form plural non-rectangular electrodes 10 in the step shown in FIG. 1(e), the member to be cut may be the metal sheet material 110 mainly located at the portion 111. As a result, in the portion 111 that becomes the cutaway region of the non-rectangular electrode 10, the member to be cut may mainly be the metal sheet material 110, accordingly, a ratio of the electrode material layer raw material 120 contained in the redundant portion (i.e., the waste portion) can be relatively reduced as compared to the prior art. In other words, a ratio in which the electrode material layer raw material is contained in the member to be cut can be relatively reduced. Therefore, the manufacturing efficiency of the non-rectangular electrode can be improved.

In addition, the exemplary embodiment of the manufacturing method disclosed herein preferably takes the following mode.

Formation of Low Wettability Region

Hereinafter, a mode is described in which the "low wettability region 130a" is formed as the above wettability control region 130.

Figure 2A:
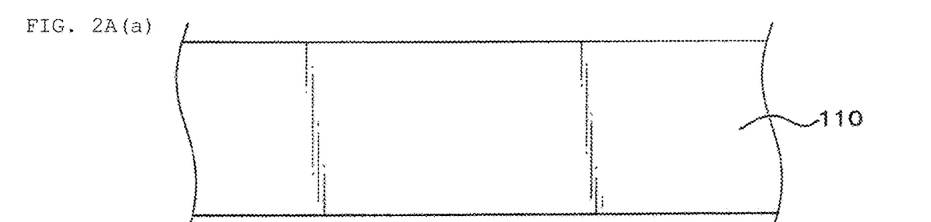
Figure 2B:
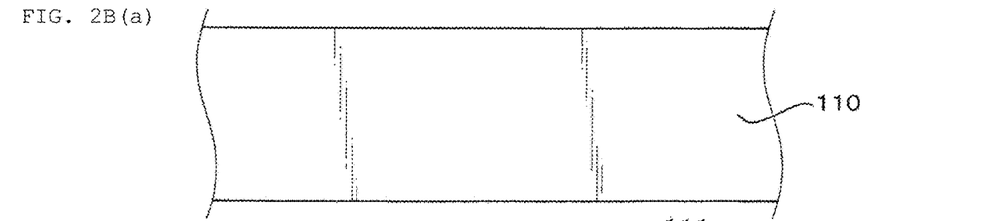

In one mode, it is preferable that, by wettability control, the wettability of the local portion of the metal sheet material 110 be made relatively lower than the wettability of the other portion except for the local portion, and the low wettability region 130a be formed as the wettability control region 130 at the local portion (see FIG. 1, FIG. 2A and FIG. 2B).

As described above, when control is made to move the electrode material layer raw material 120 that may be positioned in the local portion of the metal sheet material 110, specifically, in the portion 111 that becomes the cutaway region of the non-rectangular electrode from the portion 111 to the outer region, the electrode material layer raw material 120 can be suppressed from remaining in the portion 111 when the electrode precursor 100 is formed. The movement control of the electrode material layer raw material 120 to the outer region can be implemented by making the wettability of the portion 111 that becomes the cutaway region of the non-rectangular electrode relatively lower than the wettability of the other portion 112. That is, the movement control of the electrode material layer raw material 120 to the outer region can be implemented by forming the low wettability region 130a in the portion 111 that becomes the cutaway region of the rectangular electrode (see FIG. 1, FIG. 2A, and FIG. 2B). This means that the portion 111 that becomes the cutaway region of the non-rectangular electrode is less likely to be wetted with the electrode material layer raw material 120.

It should be appreciated that the term "relatively low wettability" as used herein is not particularly limited, but may indicate a contact angle θ (i.e., an angle formed by a tangent of a surface of the electrode material layer raw material and a surface to be coated, at a contact point of the surface to be coated and the electrode material layer raw material 12) lying within 60°<θ<150°, preferably 75°<θ<135°, and more preferably 90°<θ<120°.

When the low wettability region 130a is formed in the portion 111 that becomes the cutaway region of the non-rectangular electrode, because the portion 111 (i.e., the low wettability region 130a) that becomes the cutaway region of the non-rectangular electrode has the wettability relatively lower than the other portion except for the portion 111, when the electrode material layer raw material 120 is applied, the electrode material layer raw material 120 can be repelled by wettability from the portion 111 (i.e., low wettability region 130a). Therefore, the electrode material layer raw material 120 thus repelled by wettability is moved from the portion 111 (i.e., low wettability region 130a) to the other portion 112 or the like. Thereby, the electrode material layer raw material 120 can be preferably suppressed from remaining in the portion 111 when the electrode precursor 100 is formed. In other words, it is possible to obtain the electrode precursor 100 in which the electrode material layer raw material 120 is suppressed from remaining in the portion 111 (i.e., low wettability region 130a) that becomes the cutaway region of the non-rectangular electrode.

Formation Modes of Low Wettability Region

Hereinafter, formation modes of the above described low wettability region 130a (i.e., wettability control region 130) are described.

The followings are mentioned as the modes of forming the low wettability region 130a.

(i) Use of Low Wettability Material

In one mode, the low wettability region 130a is preferably formed by supplying a low wettability material 131 whose wettability to the electrode material layer raw material 120 is relatively lower than wettability of the other region of the metal sheet material 110 to the local portion of the metal sheet material (see FIG. 2A and FIG. 2B). It should be noted that while a mode of FIG. 2A and a mode of FIG. 2B differ in the formation locations of the low wettability material 131, it is confirmed that the technical concept of the present invention therein is fundamentally the same. Specifically, the modes of FIGS. 2A and 2B differ from each other in that the former forms the low wettability material 131 in an end part region (or side region) of the main surface of the metal sheet material in a plan view, and on the other hand, the latter forms the low wettability material 131 in a central region of the main surface of the metal sheet material in a plan view.

The step of forming the non-rectangular electrode according to the present mode is specifically described with reference to FIGS. 2A and 2B. The description is simplified for portions overlapping with the description contents in the mode of FIG. 1.

Preparation of Metal Sheet Material (FIG. 2A(a), FIG. 2B(a))

First, the metal sheet material 110 is prepared.

Application of Low Wettability Material (FIG. 2A(b), FIG. 2B(b))

Next, the low wettability material 131 is applied to the local portion (the portion 111 that becomes the cutaway region of the non-rectangular electrode) of the surface (the main surface) of the metal sheet material 110 using a die head 200A. The low wettability material 131 is not particularly limited as long as the material has a property of having low wettability to the liquid (electrode material layer raw material 120). As an example, the low wettability material 131 may include at least one selected from the group consisting of a fluorine-based material, a silicone-based material, a polyethylene-based material, a polypropylene-based material, and a silane coupling-based material, and is preferably formed by containing the fluorine-based material having a good property of having low wettability to the liquid (electrode material layer raw material 120).

By applying the low wettability material 131, the low wettability region 130a can be formed in the applied location. In addition, because the applied location of the low wettability material 131 substantially corresponds to the portion 111 that becomes the cutaway region of the non-rectangular electrode, it is necessary to determine in advance the formation location of the non-rectangular electrode finally obtained prior to the application of the low wettability material 131. By forming the low wettability region 130a using the low wettability material 131, the wettability of the low wettability region 130a (i.e., the portion 111 that becomes the cutaway region of the non-rectangular electrode) can be made relatively lower as compared to the wettability of the other portion except for the portion 111. Therefore, when the electrode material layer raw material 120 is applied later, because the portion 111 (i.e., low wettability region 130a) that becomes the cutaway region of the non-rectangular electrode has a relatively lower wettability than the other portion except for the portion 111, the electrode material layer raw material 120 can be repelled by wettability from the portion 111 (low wettability region 130a).

Figure 3:
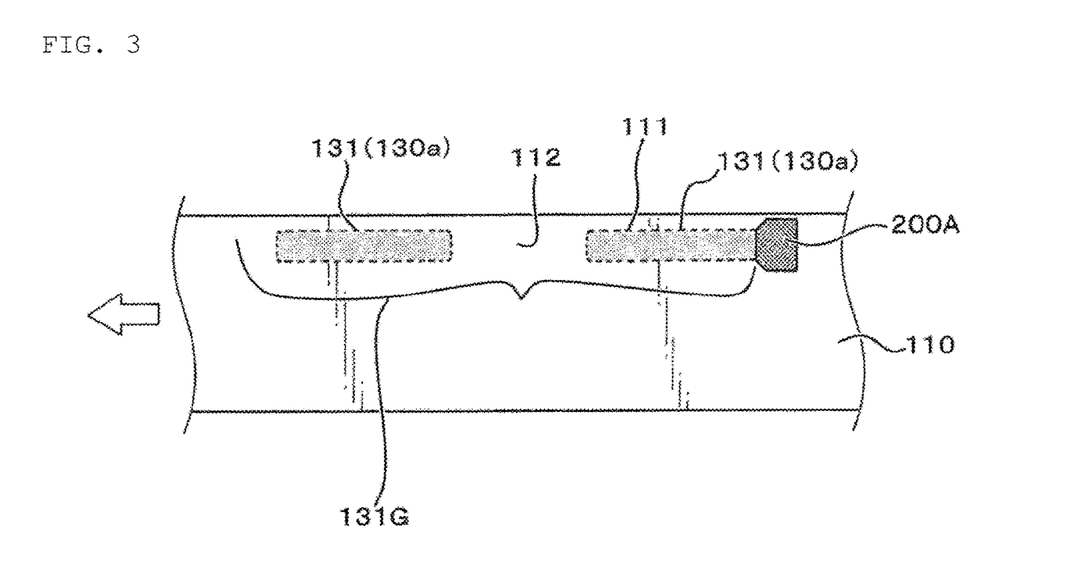
FIG. 3 is a schematic view of a formation mode of at least two low wettability regions.

In this mode, at least two low wettability regions 130a which are separated from each other along a longitudinal direction of metal sheet material 110 (direction of an arrow in FIG. 2A(b), FIG. 2B(b) and FIG. 3) can be formed by the following method. Specifically, the low wettability region 130a can be formed by intermittently applying the low wettability material 131 in one direction using the die head 200A.

In this mode, when providing at least two rows of low wettability region groups facing each other as shown in FIG. 2A(b) and FIG. 2B(b), the at least two rows of low wettability region groups facing each other can be provided as the following methods. For purposes of this disclosure, the term "low wettability region group" refers to an aggregate of plural low wettability regions 130a as defined above but separated from each other. Specifically, in this mode, at least two die heads 200A₁ and 200A₂ are independently controlled to form each of the wettability region groups 130G, as shown in FIG. 3.

In the mode shown in FIG. 2A(b), a part of an end part 120a of a coated surface of the electrode material layer raw material is preferably positioned in the low wettability region 130a in a plan view. As described above, the low wettability region 130a has a function of repelling by wettability the electrode material layer raw material 120 from the portion 111 (low wettability region 130a) that becomes the cutaway region of the non-rectangular electrode. Therefore, when the part of the end part 120a of the coated surface of the electrode material layer raw material is positioned in the low wettability region 130a in a plan view, because the wettability region 130a has the function of repelling by wettability the electrode material layer raw material 120, it is possible to preferably avoid the problem that the electrode material layer raw material 120 located at the end part 120a of the coated surface is not repelled by wettability. Although not particularly limited, in one mode, the low wettability region 130a may be positioned such that the end part 120a of the coated surface of the electrode material layer raw material 120 and an end part 130aα of the low wettability region 130a overlap with each other in a plan view.

Application of Electrode Material Layer Raw Material (FIG. 2A(c), FIG. 2B(c))

Next, while the metal sheet material 110 is rotated and moved, the electrode material layer raw material 120 is applied to the surface (main surface) of the metal sheet material 110 using a die head 200B. Specifically, the electrode material layer raw material 120 is applied such that the electrode material layer raw material 120 covers the low wettability region 130a formed in the portion 111 that becomes the cutaway region of the non-rectangular electrode.

Local Movement of Electrode Material Layer Raw Material (FIG. 2A(d), FIG. 2B(d))

When the electrode material layer raw material 120 is applied, the wettability of the low wettability region 130a formed in the portion 111 that becomes the cutaway region of the non-rectangular electrode is relatively low as compared to the other portion except for the portion 111. Accordingly, the electrode material layer raw material can be repelled by wettability from the portion 111 (low wettability region 130a). When the electrode material layer raw material is repelled by wettability from the portion 111 (low wettability region 130a), the electrode material layer raw material 120 remaining in the portion 111 (low wettability region 130a) can be more preferably suppressed when the electrode precursor 100 is formed.

Figure 4:
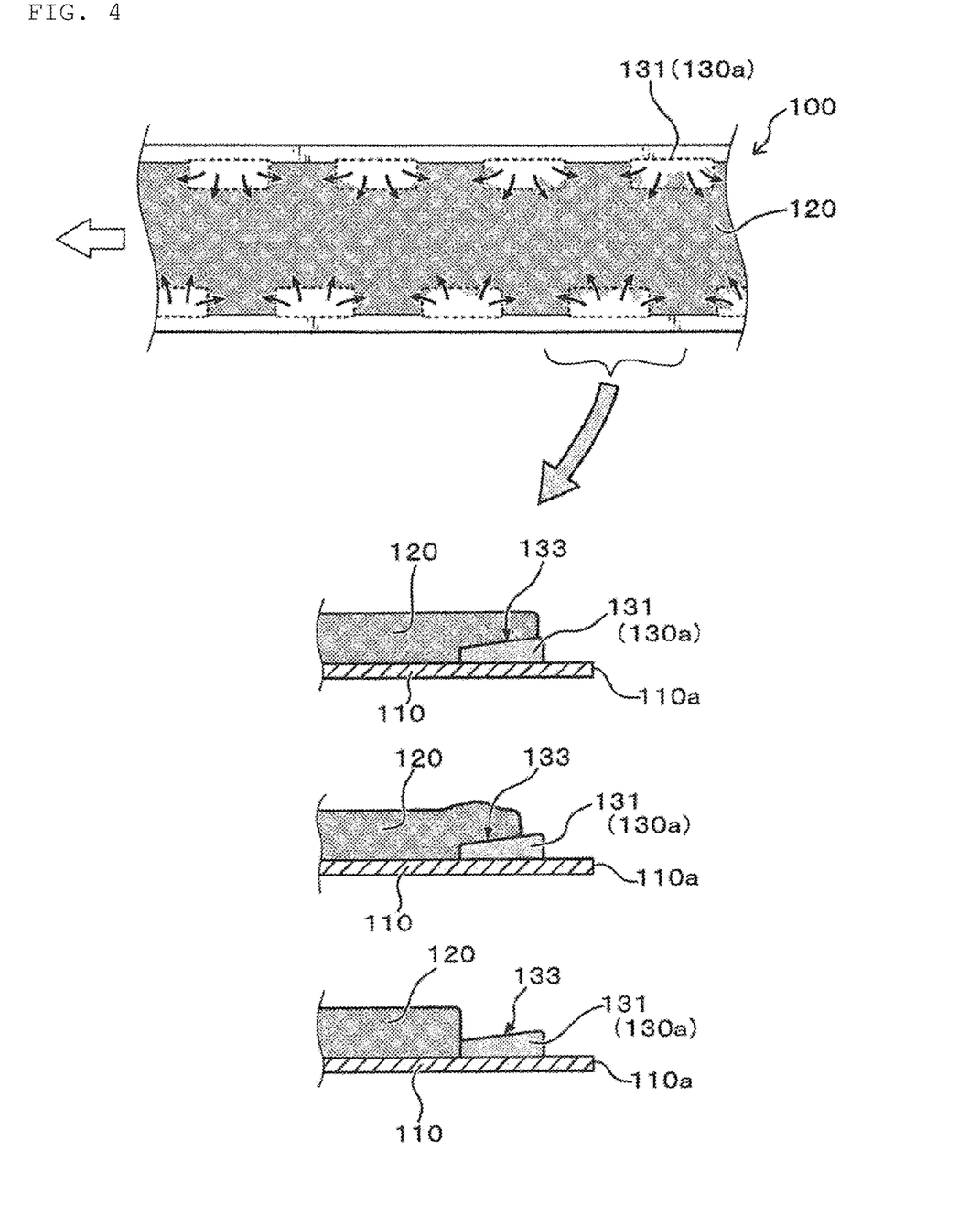
FIG. 4 is a schematic view of a low wettability region formed by having an inclined part.

In addition, as the low wettability region 130a that can be formed by applying the above described low wettability material 131, the low wettability region 130a formed by having an inclined part 130 is preferable (see FIG. 4). In particular, it is preferable to use, as the inclined part 130, one that is inclined downward toward the formation location of the electrode material layer raw material 120 applied directly to the metal sheet material 110 in a cross-sectional view. When the inclined part 130 is configured to be inclined downward toward the formation location of the electrode material layer raw material 120 applied directly to the metal sheet material 110 in a cross-sectional view, the following effects may be exhibited. Specifically, because the inclined part 130 adopting the above configuration exists, when the electrode material layer raw material 120 is applied and the electrode material layer raw material 120 is repelled by wettability from the portion 111 (low wettability region 130a) that becomes the cutaway region of the non-rectangular electrode, the electrode material layer raw material 120 repelled by wettability from the position of the low wettability region 130a formed of the low wettability material 131 can be (therefore) easily directed toward a side of the electrode material layer raw material 120 applied directly to the metal sheet material 110 where the low wettability material 131 does not exist. As a result, the electrode material layer raw material 120 repelled by wettability at the position of the low wettability region 130a can be prevented from being directed toward a side opposite to the side of the electrode material layer raw material 120 applied directly to the metal sheet material 110 in a cross-sectional view (i.e., an outer edge part 110a of the metal sheet material 110). Thereby, unnecessary waste generation of the electrode material layer raw material 120 can be avoided.

Pressurization of Electrode Precursor/Cutting of Electrode Precursor (FIG. 2A(e), FIG. 2B(e))

Next, after the electrode precursor 100 is formed, in order to obtain a desired density, the electrode precursor 100 is subjected to pressurization by having both main surfaces of the electrode precursor 100 sandwiched. Then, the electrode precursor 100 is cut. Specifically, at least the portion 111 of the electrode precursor 100 that becomes the cutaway region of the non-rectangular electrode 10 and a portion that becomes a tab 20 are cut so that plural non-rectangular electrodes 10 each having the cutaway region and the tab 20 are formed.

Formation of Non-Rectangular Electrode

As described above, the plural desired non-rectangular electrodes 10 (with tabs 20) can be obtained. In the mode shown in FIGS. 2A and 2B, an installation location of each of the tabs 20 is preferably a region except for the low wettability region 130a formed using the low wettability material 131. This is because the low wettability material 131 exists in the low wettability region 130a at the time of cutting the electrode precursor 100, therefore, when the tab 20 is provided in the low wettability region 130a, the electrode tab 20 is not easily welded to the non-rectangular electrode 10 due to the existence of the low wettability material 131.

As described above, in this mode, the low wettability region 130a is formed by applying the low wettability material 131 to the portion 111 that becomes the cutaway region of the non-rectangular electrode in the steps shown in FIG. 2A(d) and FIG. 2B(d), accordingly, it is advantageous in that the property (low wettability) of the low wettability material 131 itself can be used to repel by wettability the electrode material layer raw material 120.

It is noted that, a formation mode of the low wettability region 130a is not limited to utilization of the low wettability material 131 as described above. For example, as the formation mode of low wettability region 130a, the following is further mentioned.

(ii) Roughening of Local Portion of Metal Sheet Material

In one mode, the low wettability region 130a may be formed by roughening the local portion of the metal sheet material 110.

The mode of the above (i) utilizes the low wettability material 131 having the property of low wettability to the liquid (electrode material layer raw material 120). That is, the mode of the above (i) provides a different material to the surface of the portion 111 that becomes the cutaway region of a non-rectangular electrode among the surface of the metal sheet material 110. On the other hand, in this mode, the property of the surface itself of the portion 111 that becomes the cutaway region of the non-rectangular electrode among the surface of the metal sheet material 110 is made relatively different from the property of the other portion 112, and the portion 111 is set to be a low wettability region 130a.

Specifically, in this mode, the surface of the portion 111 that becomes the cutaway region of the non-rectangular electrode among the surface of the metal sheet material 110 is intentionally roughened, and only the surface is roughened. In other words, the surface of the other portion 112 except for the portion 111 is not roughened. Although a method of roughening is not specifically limited, for example, performing light beam irradiation, grinding or the like to the surface of the portion 111 that becomes the cutaway region of the non-rectangular electrode can be mentioned. It is noted that, the term "roughening" as used herein refers to making a surface roughness of the surface of the metal sheet material 110 into an arithmetic average roughness Rz of 1.0 μm or more and 10.0 μm or less as stated in the above described section of setting the definition.

When the surface is roughened, the surface of the metal sheet material 110 in the portion 111 that becomes the cutaway region of the non-rectangular electrode becomes rough. Therefore, because the surface becomes a rough surface, the surface may be more difficult to be wetted with the liquid (that is, the electrode material layer raw material 120) as compared to the surface of the metal sheet material 110 in the other portion 112 except for the portion 111. Because a degree of difficulty in wetting is higher in the mode (i), the electrode material layer raw material 120 located on the roughened surface is subjected to blowing or the like later. By this blowing or the like, the electrode material layer raw material 120 located on the roughened surface can be moved from the roughened surface to the other region.

Hereinafter, the formation mode of the non-rectangular electrode using a light beam is described with reference to FIG. 5.

Figure 5A:
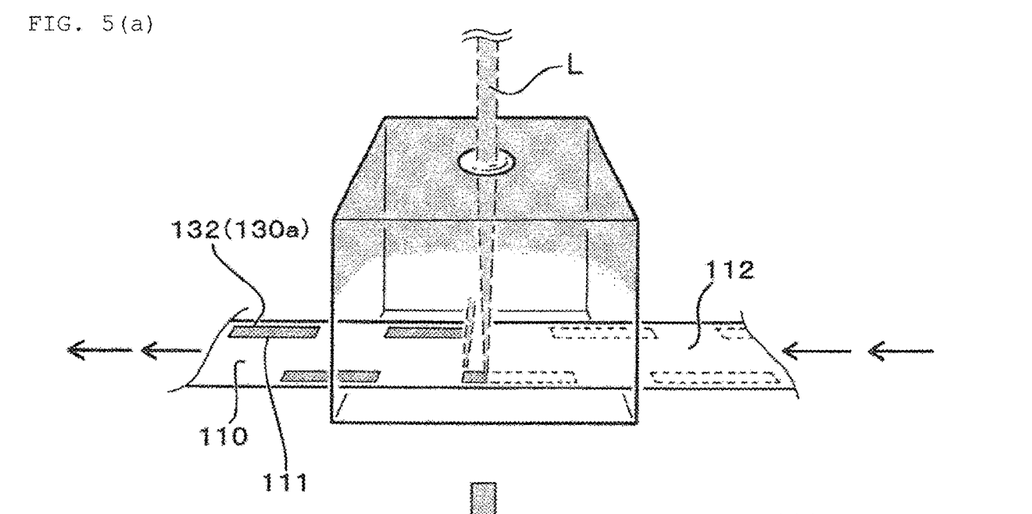
FIGS. 5(a) to 5(c) are schematic views of a manufacturing flow of the secondary battery according to the other exemplary embodiment.

Preparation of Metal Sheet Material (FIG. 5(a))

First, the metal sheet material 110 is prepared.

Irradiation with Light Beam (FIG. 5(a))

Next, the local portion (portion 111 that becomes the cutaway region of the non-rectangular electrode) of the surface (main surface) of the metal sheet material 110 is irradiated with a light beam L such as a laser. By the irradiation with the light beam L, the surface (main surface) of the metal sheet material 110 in the portion 111 that becomes the cutaway region of the non-rectangular electrode can be roughened. Because the surface (main surface) of the metal sheet material 110 in the portion 111 is roughened, the portion 111 that becomes the cutaway region of the non-rectangular electrode can be made more difficult to be wetted with the electrode material layer raw material 120 as compared to the surface of the metal sheet material 110 in the other portion 112 except for the portion 111. That is, the surface (main surface) of the metal sheet material 110 in the portion 111 can be made as the low wettability region 130a. In addition, because an irradiation site with the light beam L substantially corresponds to the portion 111 that becomes the cutaway region of the non-rectangular electrode, it is necessary to determine the formation location of the cutaway region of the non-rectangular electrode finally obtained prior to the irradiation with the light beam L.

By forming the low wettability region 130a using the light beam L, the low wettability region 130a (i.e., the portion 111 that becomes the cutaway region of the non-rectangular electrode) can be made to have a relatively lower wettability than the other portion except for the portion 111. Therefore, when the electrode material layer raw material 120 is applied later, because the portion 111 (low wettability region 130a) that becomes the cutaway region of the non-rectangular electrode has a relatively lower wettability than the other portion except for the portion 111, the portion 111 (the low wettability region 130a) can be made more difficult to be wetted with the electrode material layer raw material 120.

Figure 5B:
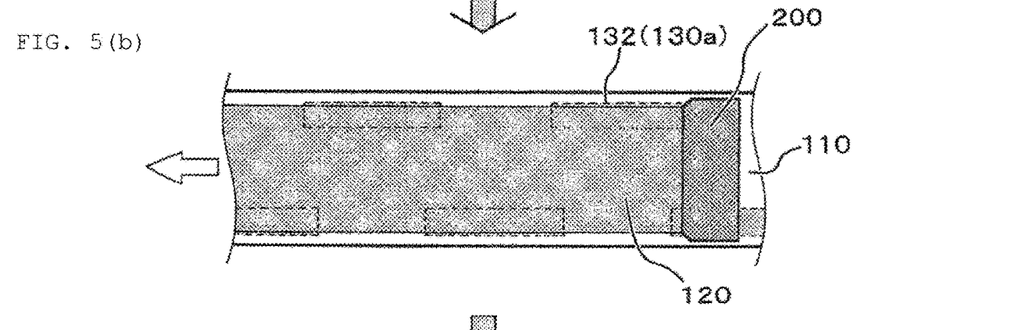

Application of Electrode Material Layer Raw Material (FIG. 5(b))

Next, while rotating and moving the metal sheet material 110, the electrode material layer raw material 120 is applied to the surface (main surface) of the metal sheet material 110 using the die head 200. Specifically, the electrode material layer raw material 120 is applied such that the electrode material layer raw material 120 covers the low wettability region 130a formed in the portion 111 that becomes the cutaway region of the non-rectangular electrode.

The surface of the metal sheet material 110 in the portion 111 that becomes the cutaway region of the non-rectangular electrode that has been irradiated with the light beam is a roughened surface, and accordingly, may be relatively more difficult to be wetted with the liquid (i.e., the electrode material layer raw material 120) as compared to the surface of the metal sheet material 110 in the other portion 112 except for the portion 111. Therefore, after the electrode material layer raw material 120 is applied, the surface of the metal sheet material 110 in the portion 111 that becomes the cutaway region of the non-rectangular electrode may become more difficult to be wetted with the electrode material layer raw material 120.

Figure 5C:
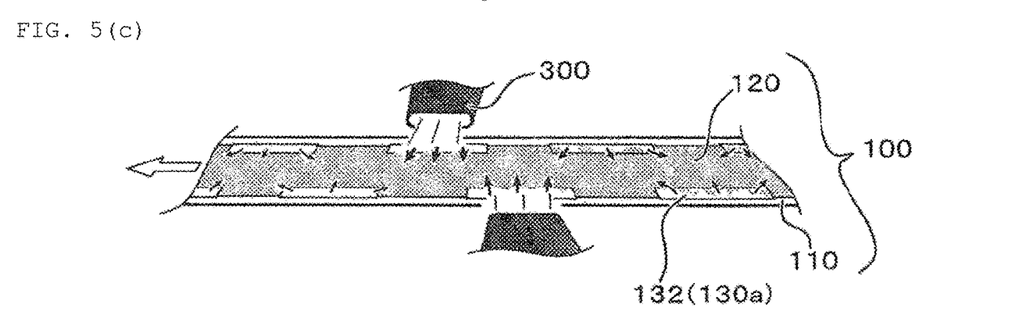

Blowing of Electrode Material Layer Raw Material (FIG. 5(c))

Next, the electrode material layer raw material 120 located on the surface of the metal sheet material 110 in the portion 111 that becomes the cutaway region of the non-rectangular electrode is subjected to blowing using a blower 300. As described above, the surface of the metal sheet material 110 in the portion 111 is more difficult to being wetted with the electrode material layer raw material 120, therefore, when the blowing is performed, the electrode material layer raw material 120 can be easily moved to the other portion except for the portion 111 that becomes the cutaway region of the non-rectangular electrode (specifically, toward the coated surface of the electrode material layer raw material). According to this movement, (i) the electrode material layer raw material 120 can be suppressed from remaining in the portion 111 (low wettability region 130a) when the electrode precursor 100 is formed. In addition to this, if a direction of blowing the air is controlled relatively inward and not outward in the blowing, (ii) the electrode material layer raw material 120 can be unnecessarily wasted when the electrode precursor 100 is cut later.

It is noted that FIG. 5(c) mainly shows the blowing on the electrode material layer raw material, however, in combination with the blowing or instead of the blowing, suction of the electrode material layer raw material 120 using a suction device can be performed. According to the suction, it is possible to directly control to suppress the electrode material layer raw material 120 from remaining in the portion 111 (low wettability region 130a) when the electrode precursor 100 is formed.

Finally, the electrode precursor 100 is subjected to pressurization and subsequent cutting, thereby plural desired non-rectangular electrodes (with tabs) are obtained. In addition, as compared to the mode shown in FIG. 2A and FIG. 2B (formation mode of the non-rectangular electrode using low wettability material), in this mode, only the metal sheet material may exist in the location where the tab may be installed. For this reason, it is confirmed that there is no particular limitation on the installation location of the tab.

The secondary battery according to an exemplary embodiment of the present invention can be used in various fields where power storage is assumed. For example, the secondary battery according to one embodiment, in particular, the non-aqueous electrolyte secondary battery can be used in: the field of electrical, information, and communication where mobile devices are used (for example, the field of mobile devices such as mobile phones, smart phones, laptop computers and digital cameras, activity meters, arm computers, and electronic papers); home/small industrial applications (for example, the fields of power tools, golf carts, and home/care/industrial robots); large industrial applications (for example, the fields of forklifts, elevators, and harbor cranes); the field of transportation systems (for example, the fields such as hybrid vehicles, electric vehicles, buses, trains, electrically assisted bicycles, electric motorcycles, etc.); power system applications (for example, the fields such as various power generation, load conditioners, smart grids, and general household installed storage systems); and also, the IoT field, space/deep sea applications (for example, the fields such as space probes and submersible research vessels), and the like.

DESCRIPTION OF REFERENCE SYMBOLS

100: electrode precursor
110: metal sheet material
111: portion that becomes cutaway region of non-rectangular electrode
112: electrode material layer raw material
130: wettability control region
130a: low wettability region
200: die head
10: non-rectangular electrode
20: tab

The invention claimed is:

1. A method of manufacturing a secondary battery that includes a non-rectangular electrode, the method comprising:
controlling a wettability of a local portion on a surface of a metal sheet material to be lower than a wettability of another portion of the metal sheet material other than the local portion to form a low wettability region as by forming a wettability control region at the local portion;
after forming the wettability control region, forming an electrode precursor by applying an electrode material layer raw material on the metal sheet material that becomes a current collector; and
cutting away the local portion with the respective portion of the electrode material layer raw material to form a cutaway region of the non-rectangular electrode.

2. The method of manufacturing according to claim 1, further comprising forming the low wettability region by supplying, at the local portion of the metal sheet material, a low wettability material having the wettability for the electrode material layer raw material relatively lower than the wettability of the other portion of the metal sheet material.

3. The method of manufacturing according to claim 2, further comprising forming the low wettability material to include at least one of a fluorine-based material, a silicone-based material, a polyethylene-based material, a polypropylene-based material, and a silane coupling-based material.

4. The method of manufacturing according to claim 2, further comprising forming the low wettability material to include a fluorine-based material.

5. The method of manufacturing according to claim 2, further comprising intermittently applying the low wettability material in one direction using a die head to form a low wettability region group including at least two of the low wettability regions that are separated from each other along a longitudinal direction of the metal sheet material.

6. The method of manufacturing of claim 5, further comprising forming at least two rows of the low wettability region groups that face each other.

7. The method of manufacturing of claim 6, further comprising forming each of the wettability region groups by using at least two of the die heads.

8. The method of manufacturing according to claim 1, further comprising forming the low wettability region to include an inclined part relative to a main surface of the metal sheet material, such that the inclined part is inclined downward in a cross sectional view toward a formation location of the electrode material layer raw material directly applied to the metal sheet material.

9. The method of manufacturing according to claim 1, further comprising positioning an end part of a surface coated with the electrode material layer raw material within the low wettability region in a plan view.

10. The method of manufacturing according to claim 1 further comprising forming the low wettability region by subjecting the local portion of the metal sheet material to a roughening process.

11. The method of manufacturing according to claim 10, wherein the roughening process comprises irradiating the local portion of the metal sheet material with a light beam.

12. The method of manufacturing according to claim 1, further comprising cutting the electrode precursor to form a plurality of the non-rectangular electrodes.

13. The method of manufacturing according to claim 12, further comprising cutting the electrode precursor such that the plurality of the non-rectangular electrodes are arranged in line symmetry or point symmetry with each other.

14. The method of manufacturing according to claim 1, further comprising forming the non-rectangular electrode to have a layer configured to store and release lithium ions.

15. A method of manufacturing a secondary battery that includes a non-rectangular electrode, the method comprising:
forming a wettability control region on a main surface of a metal sheet material to be lower than a wettability of another portion of the metal sheet material to form a low wettability region as the wettability control region;
after forming the wettability control region, applying an electrode material layer raw material on the metal sheet material that includes the wettability control region to form an electrode precursor; and
cutting away the wettability control region with a respective portion of the electrode material layer raw material disposed thereon to form a cutaway region of the non-rectangular electrode.

16. The method of manufacturing according to claim 15, further comprising forming the low wettability region by supplying, on the main surface of the metal sheet material, a low wettability material having the wettability for the electrode material layer raw material relatively lower than the wettability of the other portion of the metal sheet material.

17. The method of manufacturing according to claim 16, further comprising intermittently applying the low wettability material in one direction using a die head to form a low wettability region group including at least two of the low wettability regions that are separated from each other along a longitudinal direction of the metal sheet material.

18. The method of manufacturing according to claim 16, further comprising forming the low wettability region by irradiating the metal sheet material with a light beam to form a roughened surface thereon.

* * * * *